United States Patent [19]

Kahler et al.

[11] Patent Number: 4,999,302
[45] Date of Patent: Mar. 12, 1991

[54] BIOLOGICAL CONTACT GAS SCRUBBER FOR WASTE GAS PURIFICATION

[76] Inventors: Brett D. Kahler, 54 Carberry Crescent, Brampton, Ontario; Matthew P. McKim, 1215 8th Line, Oakville, Ontario, both of Canada

[21] Appl. No.: 737,878

[22] Filed: May 28, 1985

[30] Foreign Application Priority Data

May 30, 1984 [GB] United Kingdom ............... 8413751

[51] Int. Cl.$^5$ .......................... C12S 5/00; C12M 1/10
[52] U.S. Cl. ..................................... 435/266; 435/300; 435/312; 435/315; 435/813; 210/619; 422/122; 422/171; 55/92; 55/240
[58] Field of Search ............... 435/266, 312, 313, 284, 435/285, 286, 288, 299, 300, 315, 813, 287; 422/122, 171; 210/619; 55/84, 90, 91, 92, 93, 220, 240

[56] References Cited

U.S. PATENT DOCUMENTS

| 1,701,825 | 2/1929 | Seil | 435/266 |
|---|---|---|---|
| 1,738,543 | 12/1929 | Travers | 435/266 X |
| 2,200,581 | 5/1940 | Pruss et al. | 435/266 |
| 3,216,905 | 11/1965 | Baptist | 435/266 |
| 3,446,241 | 9/1969 | Simpson | 210/619 |
| 3,594,277 | 7/1971 | Mako | 435/315 X |
| 3,933,585 | 1/1976 | McAleer | 435/284 X |
| 4,130,482 | 12/1978 | Torpey | 210/619 |
| 4,211,647 | 7/1980 | Friedman et al. | 210/619 X |
| 4,446,236 | 5/1984 | Clyde | 435/315 X |
| 4,662,900 | 5/1987 | Ottengraf | 435/266 X |

FOREIGN PATENT DOCUMENTS

| 2643211 | 4/1978 | Fed. Rep. of Germany | 435/266 |
|---|---|---|---|
| 2722013 | 11/1978 | Fed. Rep. of Germany | . |

Primary Examiner—David L. Lacey
Assistant Examiner—William H. Beisner
Attorney, Agent, or Firm—Sim & McBurney

[57] ABSTRACT

Process and apparatus is disclosed for removing pollutants from a waste gas stream comprising culturing in a rotary biocontactor a biomass capable of assimilating the pollutants and producing harmless metabolites. The waste gas stream is brought into contact with the biomass within the biocontactor. The biocontactor includes a plurality of discs mounted for rotation within the biocontactor. The waste gas stream in passing over the exposed biomass on the disc results in the pollutants being absorbed by the biomass. In turn the biomass assimilates the pollutants and produces harmless metabolites. The gas stream with a substantial percentage of pollutants removed therefrom and containing any gaseous metabolites is exhausted from the biocontactor.

9 Claims, 4 Drawing Sheets

FIG.2.

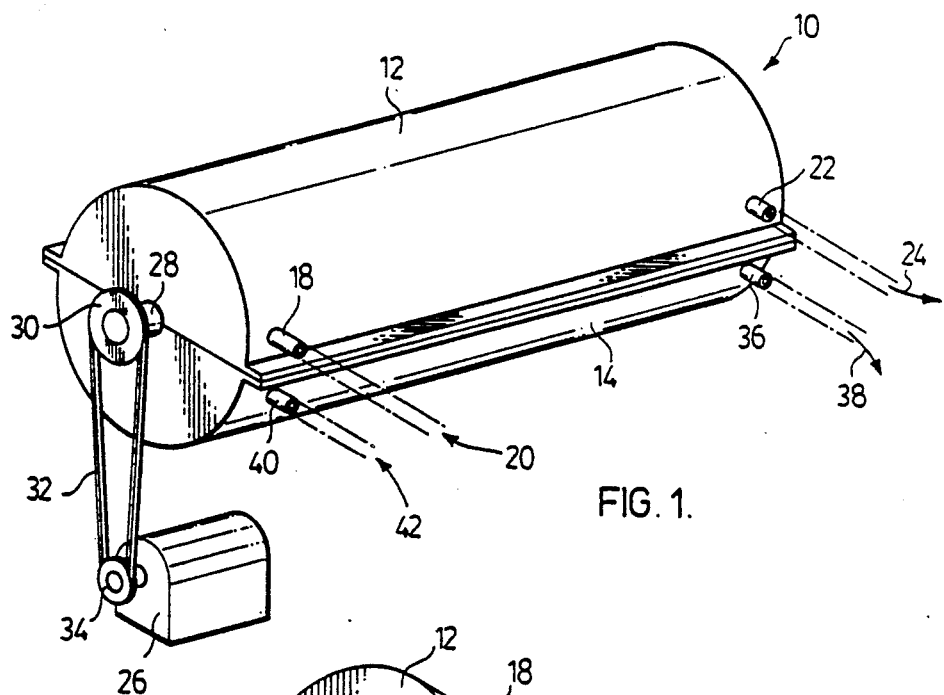
FIG. 1.
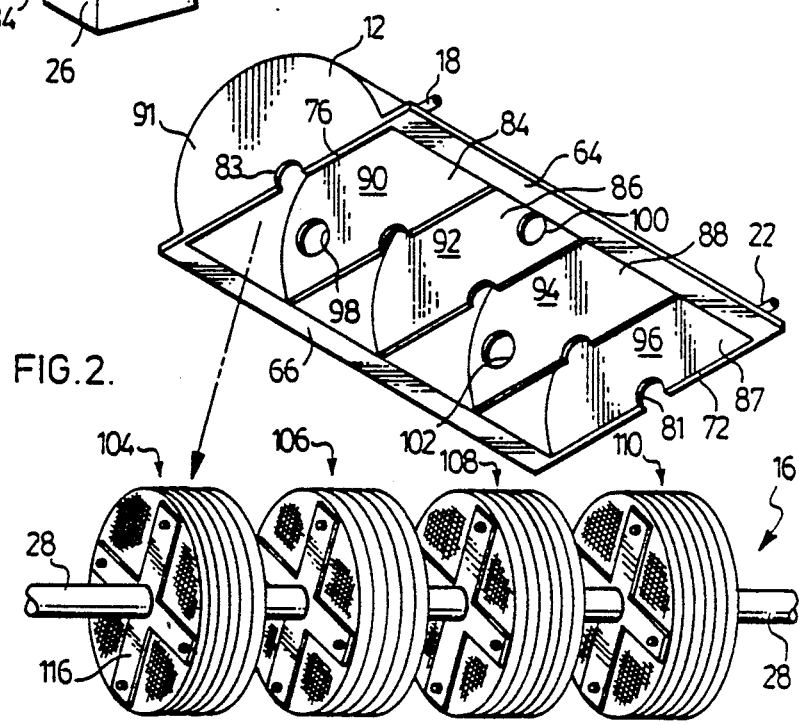
FIG. 2.
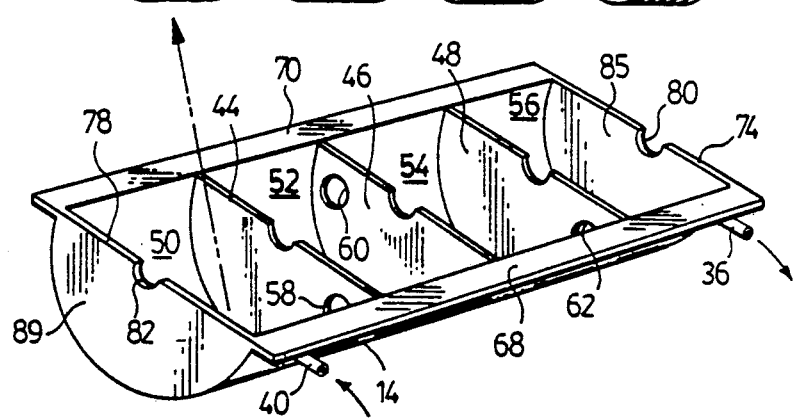

4,999,302

BIOLOGICAL CONTACT GAS SCRUBBER FOR WASTE GAS PURIFICATION

FIELD OF THE INVENTION

This invention relates to the continuous removal of pollutants from waste gas streams by use of a microbiological system.

BACKGROUND OF THE INVENTION

Waste gases are the by-products of various manufacturing processes. Environmental legislation requires, for example, that these wastes be removed from the air before it is released into the atmosphere. Presently, companies employ a system of wet scrubbers to cleanse their manufacturing exhaust of these wastes. The exhaust, for example, is passed up through a wet scrubber consisting of a water tower packed with ceramic rings. Water flows down through the scrubber and absorbs the water soluble gases due to a concentration gradient that favors the absorption of the gases from the exhaust into the water.

The contaminated water is then disposed into the water sewage system and treated usually before being released into the water systems. A rotary biocontactor is one of the devices used to process waste water in the treatment plants. This device requires passing water through a wheel consisting of multiple mesh discs on which a biomass is growing. The biomass converts the carbon waste products into $CO_2$ instance.

U.S. Pat. No. 3,335,081 discloses an example of this type of rotary biocontactor for treating sewage. A plurality of rotating discs supporting the growth of biomass rotates through the sludge circulated through the apparatus while the upper portion of the discs are exposed to air to thereby provide the necessary oxygen in maintaining the viability of the biological system in degrading the contaminants in the liquid sludge stream.

Other processes involving rotating discs in biological systems are disclosed in U.S. Pat. Nos. 3,594,277 and 4,446,236. Neither of these systems are directed to the removal of pollutants from a gas stream by the use of rotary biocontactor systems.

It is known to purify gases using microorganisms by techniques such as disclosed in U.S. Pat. Nos. 1,701,825, 2,200,581, 2,793,096 and 3,216,905. These systems involve in one form or another contacting a biomass with the waste gas stream to be purified. The waste gases are brought into contact with fine sprays of medium containing the bacteria as disclosed in U.S. Pat. No. 1,701,825. Other techniques of contacting the waste gases with the bacteria include growing the bacteria on supporting media, such as disclosed in U.S. Pat. No. 2,200,581. Soil microorganisms may be used in purifying gases, such as disclosed in U.S. Pat. Nos. 2,793,096 and 3,216,905.

Rotating biocontactors are also used in the production of vaccines such as disclosed in U.S. Pat. Nos. 3,839,155, 3,933,585 and 4,080,258. The systems function in a manner similar to other forms of rotary biocontactors where air or other oxygen containing gas passes over top of the contactor discs to provide the necessary oxygen needed during the metabollic growth of the microorganisms in producing the desired vaccines.

SUMMARY OF THE INVENTION

The method and apparatus, according to this invention, removes waste gases from a waste gas stream directly by the use of a viable biomass. The method and apparatus is more compact, more efficient, costs less to operate and is readily assembled.

According to this invention, a waste gas stream is passed through an enclosed rotary biocontactor to expose viable biomass to the moving gas stream. The pollutants in the waste gas stream are absorbed in the liquid of the biomass and assimilated by the organisms to produce non-toxic metabolites.

According to an aspect of the invention, a process removes pollutants from a waste gas stream comprising culturing in a rotary biocontactor a biomass capable of the assimilating the pollutants and producing harmless metabolites by contacting the waste gas stream with the biomass. Biomass is cultured in the biocontactor having a chamber enclosing a plurality of discs mounted for rotation about an axis. The biomass is provided in the bottom portion of the biocontactor and the discs are rotated through the biomass. The biomass is grown on the discs. The waste gas stream is introduced to the chamber and is passed through the chamber above the biomass and over exposed portions of the rotating disc having the biomass growing thereon. The pollutants are removed from the waste gas stream by the biomass on the exposed portions of the disc absorbing the pollutants, assimilating the pollutants and producing harmless metabolites as the discs continue to rotate. The gas stream with a substantial percentage of pollutants removed therefrom and containing any gaseous metabolites is exhausted at a location in the chamber downstream from where the waste gas stream is introduced to the chamber.

According to another aspect of the invention, an apparatus is provide for removing pollutants from a waste gas stream by use of a rotary biocontactor. The apparatus comprises a chamber defined within a housing. A plurality of partition means is provided within the housing for defining a plurality of serially arranged intercommunicating sub-chambers. Aperture means within each of the partition means provides for liquid and gas communication between adjacent sub-chambers. Means introduces a waste gas stream to a first of the sub-chambers and means exhausts the gas stream from the last of the sub-chambers. Rotor means extends through all of the sub-chambers on which a plurality of discs are mounted in each sub-chamber. Means rotates the rotary means to rotate the discs within each sub-chamber. Each of the sub-chambers contains a biomass to a level of the aperture means providing for a liquid flow from one sub-chamber to the next. Means withdraws the biomass liquid from a last of the sub-chambers and means introduces to the first sub-chamber a liquid containing nutrient for the biomass.

BRIEF DESCRIPTION OF THE DRAWINGS

Preferred embodiments of the invention are shown in the drawings wherein;

FIG. 1 is a perspective view of the rotary biocontactor apparatus according to this invention;

FIG. 2 is an exploded view in perspective of the biocontactor apparatus of FIG. 1;

DETAILED DESCRIPTION OF THE PREFERRED EMBODIMENTS

Figure 3:
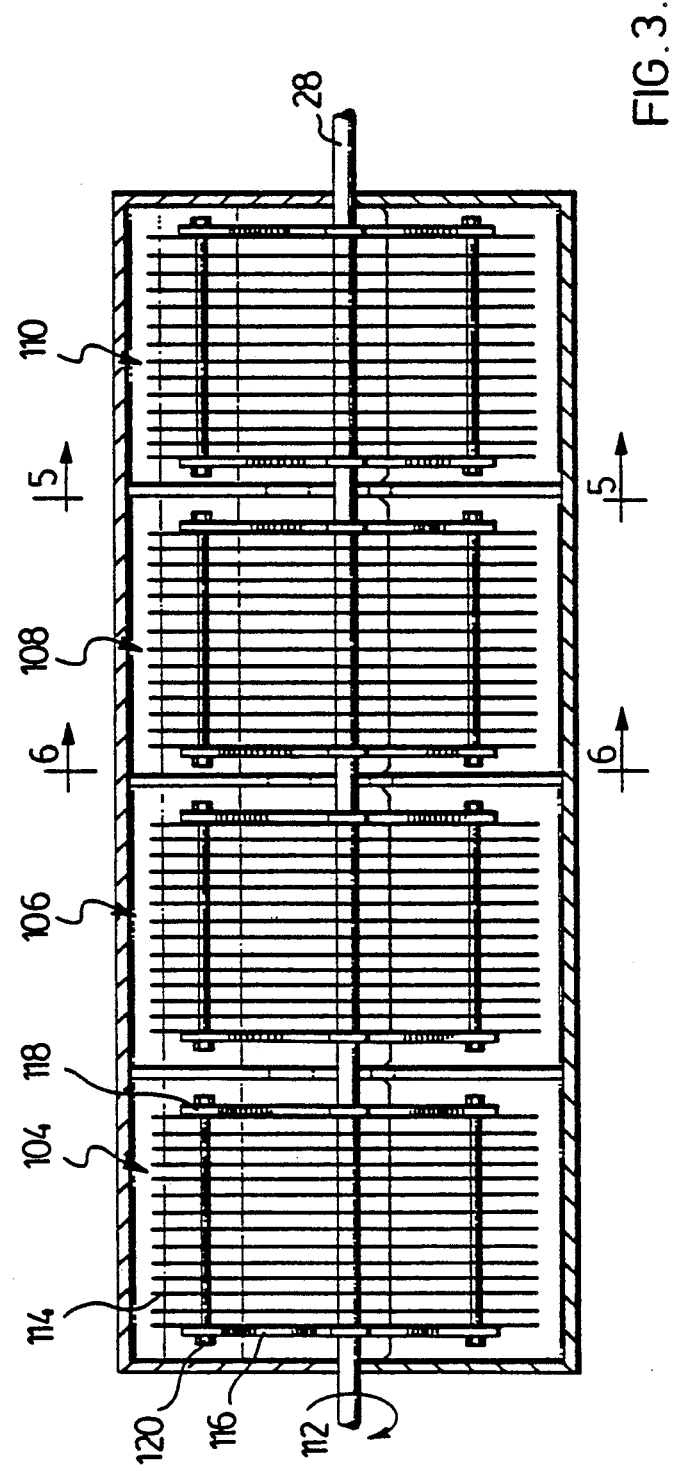
FIG. 3 is a top plan view of the apparatus of FIG. 1 with the cover removed.

As shown in FIG. 1, the biocontactor apparatus 10 has a chamber consisting of a hemi-cylindrical upper shell or housing 12 and a corresponding hemi-cylindrical bottom shell or housing 14. These shells may be made of various corrosion resistant materials, preferably rigid molded fiberglass resin material. The shells define a chamber enclosing the rotary biocontactor 16 as shown in FIG. 2. The phenol laden waste gas stream to be treated by the apparatus 10 is introduced to the biocontactor via conduit 18 in the direction of arrow 20 and is exhausted from the system via outlet 22 in the direction of arrow 24 at a location in said chamber downstream of said inlet 18. The biocontactor device 16 is rotated within the apparatus 10 by motor 26 which belt drives axle 28 having pulley 30 mounted thereon and connected by drive belt 32 to pulley 34 of the motor. The rotary biocontactor device is partially immersed in the biomass medium contained in the lower shell 14. The medium is circulated through an external solid separating device (not shown) where the biomass liquid is removed from the lower shell 14 through outlet 36 in the direction of arrow 38 and returned to the liquid inlet 40 in the direction of arrow 42.

Turning to FIG. 2, further details of the interior of the special rotary biocontactor apparatus are shown. The lower shell 14 has three interior baffles or partitions 44, 46 and 48 which define for the biomass medium four discrete liquid sub-chambers or zones 50, 52, 54 and 56. The biomass medium is allowed to circulate through the sub-chambers as induced by removing the biomass through outlet 36. The circulation along the shell 14 amongst the sub-chambers or zones is effected by apertures 58, 60 and 62 in the baffles 44, 46 and 48. The apertures provide for a criss-crossing flow of the biomass liquid through the chambers 50, 52, 54 and 56, whereby channeling of the biomass liquid from the inlet to the outlet is avoided to ensure steady state for the biomass medium in each of the discrete chambers 50, 52, 54 and 56.

The cover 12 is provided with flanges 64 and 66 which are secured to opposing corresponding flanges 68 and 70 to provide a gas tight seal about these portions of the apparatus. Gasket material (not shown) is also provided along opposing edges 72, 74, 76 and 78 of the cover and bottom to seal the end portions. Also not shown, appropriate seals are provided about the axle 28 of the biocontactor unit 16 at both ends to seal about the opposing recessed portions 80 and 81 of the upper and lower shell end walls 85 and 87; and to seal about the opposing recessed portions 82 and 83 of the upper and lower shell end walls 89 and 91. This arrangement provides a completely gas tight environment in the apparatus 10.

The phenol laden gas stream under pressure is introduced to the inlet 18 of the biocontactor apparatus and is then allowed to flow through the upper discrete chambers defined by baffles 84, 86 and 88. These baffles in turn define the individual gaseous sub-chambers or zones 90, 92, 94 and 96 which overlie the lower liquid sub-chambers 50, 52, 54 and 56. To avoid channeling of the gas flow through the respective gas contact sub-chambers, apertures 98, 100 and 102 ensure that the air flow criss-crosses through the chambers and over the biocontactors before exhausting through outlet 22.

The biocontactor unit 16 consists of four discrete units 104, 106, 108 and 110 which are individually located in the corresponding liquid/gas sub-chambers 50/90, 52/92, 54/94 and 56/96. This relationship is shown more clearly in FIG. 3 where each biocontactor unit 104, 106, 108 and 110 is concentrically mounted on the axle 28 which rotates in the direction of arrow 112. Each biocontactor unit, such as 104, includes a number of spaced-apart circular discs 114 which are concentric with the axle 112. Each end of biocontactor unit 104 is provided with opposing rigid frames 116 and 118. As shown in FIG. 2, the frames are in the form of a cross with aligned leg portions through which fasteners 120 extend. As shown in more detail in FIG. 4, each leg 122 of frame 116 and 124 of frame 118 have a fastener 120 extending through aperture 126 and a corresponding aperture (not shown) in leg 124. Each disc 114 has a corresponding aperture 128 through which the fastener 120 extends. Between each disc is a spacer 130 which defines the space between each disc. Upon insertion of the fastener through the apertures 126, 128 and spacers 130, nut 132 is used to complete the assembly at the four extremities of the legs of each frame 116 and 118. According to a preferred embodiment of the invention, these frames 116, 118 and fasteners and spacers may all be made of stainless steel. The discs 114 are perforated and flexible and may be made of a suitable plastic material which acts as an inert support for the growth of the biomass.

Figure 4:
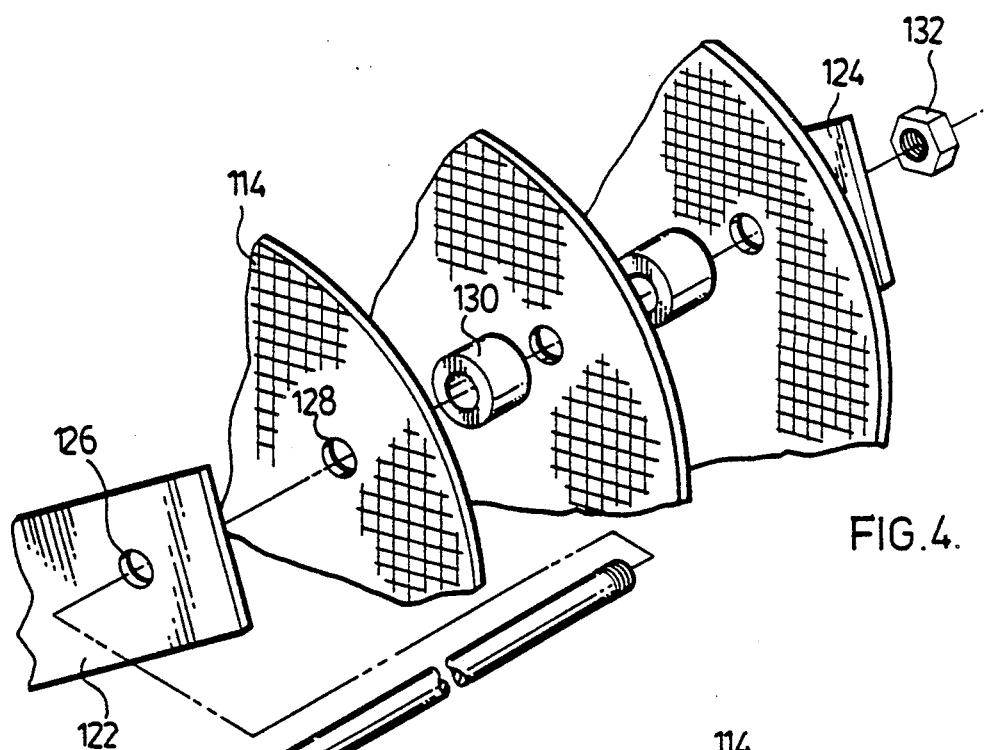
FIG. 4 is a section of the biocontactor disc showing the assembly thereof.
Figure 5:
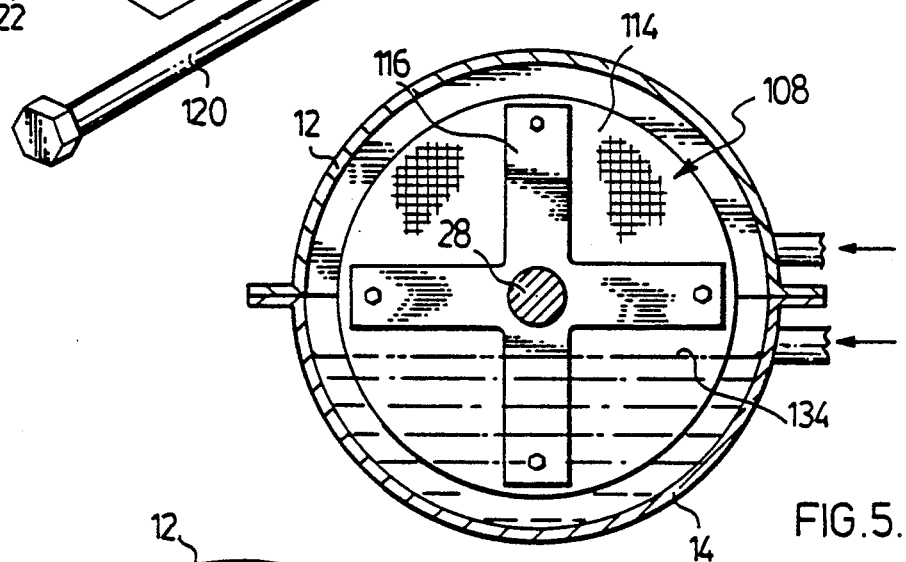
FIG. 5 is a section through FIG. 1 at the position indicated by lines 5—5 in FIG. 3.
Figure 6:
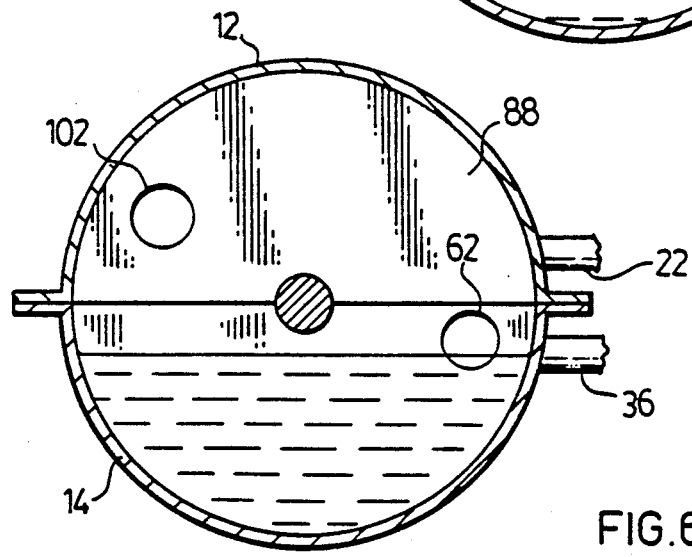
FIG. 6 is a section through the apparatus of FIG. 1 at the position indicated by lines 6—6 in FIG. 3.

Turning to FIG. 5, the liquid level 134 is shown in the lower portion 14 of the biocontactor. One leg is rotated in the direction 112 as shown in FIG. 3, where the biomass growing on each disc 114 is continuously passed through the biomass liquid 134 to maintain a continuous growth of the biomass on the discs. The discs 114 may be of open mesh construction to facilitate attachment of the growing biomass to the discs. As shown in FIG. 6, the liquid level is above the aperture 62 to provide for a liquid flow therethrough as it is removed through outlet 36. Correspondingly the gas stream flow is above the biomass and over and around the biocontactor discs 104, 106, 108 and 110 as it criss-crosses through the respective chambers predetermined by the tortuous path defined by the apertures in the baffles.

The apparatus, in accordance with this invention, provides for a readily manufactured, enclosed rotary biocontactor system. The shells and partitions or baffles may be formed by molding a combination of fiberglass with polyester resins in accordance with well known techniques. Appropriate bearings may be provided in each respective end wall of the opposing lower and upper shells to support rotation of the rotor 28 in the biocontactor. The system is readily assembled by clamping the opposing shells 12 and 14 together with the rotor and disc arrangement located within the assembled channels. Standard types of split bearings may be used to support the rotor at the end walls of the assembled shells and optionally at locations along the respective partitions 44, 46, and 48. The chamber within the assembled shells may be gas tight to ensure that an anaerobic environment may be provided within the rotary biocontactor to digest particular pollutants under anaerobic conditions. Clamps or the like, which are used to assemble the shell halves, may be removed to provide for ready disassembly of the biocontactor for purposes of service and clean-out if required.

Figure 7:
FIGS. 7, 8, 9 and 10 are photographs of the biomass at four distinct stages zones along the biocontactor apparatus.
Figure 8:
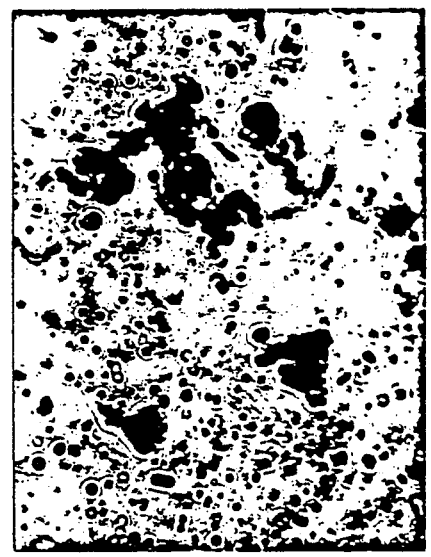
Figure 9:
Figure 10:

The biomass composition varies in each of the chambers 50, 52, 54 and 56 of the lower half of the apparatus. The chamber 50, which is the first in the series and is exposed to the highest concentration of phenol in the waste stream has, as shown in FIG. 7, the highest proportion of phenol digesting bacteria. The proportion of higher lifeforms increases along the length of the reactor in remaining chambers 52, 54 and 56. At each stage the phenol concentration becomes less, thereby permitting growth of the more vulnerable higher lifeforms. This is exemplified in FIGS. 8, 9 and 10 showing in the second, third and fourth chambers an increasing occurrence of the higher, more complex lifeforms such as worms.

The waste stream to be treated by the biomass is introduced to inlet 18 The waste stream travels through each chamber 90, 92, 94 and 96 as it passes over, around and possibly through the discs of each contactor unit 104, 106, 108 and 110 The biomass grows on each of the discs. The pollutants in the waste stream diffuse into the liquid containing the biological system of biomass, whereby the biomass assimilates the pollutants, grows and forms metabolites which are harmless to the atmosphere According to this preferred aspect of the invention in treating phenol laden gases, the biological system in the chambers is acclimated to the phenol carbon source In accordance with standard procedures, the biological system could be acclimated to any other nutrient source, such as, carbon which is to be treated in a gaseous stream. The removal of ketones from a gas stream and sulfides from a gas stream are other examples of aerobic systems. It is appreciated that there is an application in an anaerobic system.

The air flow follows the tortuous path over and through the discs and through the chambers and in so doing, allows the phenol to diffuse by mass transfer into the water of the biological system growing on the disc. The phenol is immediately absorbed because the continuous digestion of phenol by the biological system maintains a high concentration gradient of phenol between the water of the biomass medium and the gas stream passing through the upper chambers. Thus by the biological system continuously removing phenol from the liquid medium, this maintains a high rate of mass transfer of the phenol from the gas stream into the biomass liquid which cannot be accomplished in standard wet scrubbing systems. In order for wet scrubbing systems to achieve a comparable situation, there would be a need to continuously replace water which is limited due to flooding of a packed tower or the like. The conversion of the phenol in the water by the biomass permits this water medium to be reused on a continuous basis. The biomass in the lower chamber and on the rotary biocontactors is kept in a steady state by the circulation of the water medium. When water is removed from the lower chamber, it is flushed of the excess biomass in accordance with standard techniques of separating biological solids from the liquid. Nutrients, such as nitrogen and phosphorus, are added to the recirculating water. The fortified water is returned into the lower chamber of the apparatus to replenish the biomass with the necessary nutrients. As the biomass liquid is circulated from sub-chamber to sub-chamber, the nutrients are adequately distributed where steady state is eventually established amongst the intercommunicating sub-chambers. The separation of biological solids from liquids removed from the apparatus prevents an excess build-up of biomass in the system to provide for its continued operation.

EXAMPLE 1

Numerous test runs were conducted to measure the effectiveness of the system. The tests were set up so that a certain level of phenol in a gas stream was fed through the system during a measured period of time. The gas flow rate was varied with each trial. The gas stream leaving the system was passed through an impinger consisting of 10 g of sodium hydroxide in 100 ml of water. This impinger absorbed any phenol gas that was left in the gas stream after it passed through the system because sodium hydroxide reacts with phenolic compounds. After the test run was completed, the level of phenol in the liquid in each of the four sub-chambers of the system and the impinger was measured. These measurements indicated the effectiveness of the system as any phenol from the gas stream that was not degraded by the biomass should have been found in either the aqueous medium or the impinger.

Given this experimental framework, 10.5 g of phenol was fed through the system in a gas stream flowing at a rate of 6.8 l/min. over the course of 16 hours. After this test run, the level of phenol in the liquid phase in each of the four sub-chambers was less than 0.0005 mg/l. The amount of phenol that reacted with the sodium hydroxide solution was 0.122 mg. The efficiency of the system is 99.99% as 0.122 mg of phenol was found, after 10.5 g of phenol has passed by means of the gas stream through the system.

The next trial run involved passing 11.7 g of phenol in a gas stream flowing at a rate of 10.6 l/min. over the course of 18.5 hours. After this test run, the level of phenol in the liquid phase in each of the sub-chambers was in the range of less than 0.002 mg/l to 0.0005 mg/l. It was discovered that 0.193 mg of phenol reacted with the sodium hydroxide solution. Thus the system is 99.99% efficient as 0.193 mg of phenol compound was found, after 11.7 g of phenol was passed through the system.

In the last experimental run, 3.0 g of phenol passed through the system at a rate of 10.7 l/min. over the course of 3.5 hours. The level of phenol found in the liquid phase was in the range of 0.0106 mg/l to 0.0005 mg/l. It was discovered that 0.165 mg of phenol had reacted with the sodium hydroxide solution. Again, the system is 99.99% efficient as 0.165 mg of phenol compound was found after 3.0 g was passed through the system.

EXAMPLE 2

In accordance with the procedures used in Example 1 for analyzing the phenol removal percentages by the rotary biocontactor, the system was then operated for a total of 373 days where, from time to time, the efficiency in phenol removal based on varying input rates of phenol in the waste gas stream were determined. The results of the 373 day run are set out in the following Table 1.

TABLE 1

| Day | Air flow M3/day | Input Phenol mg/M3 | Input Phenol mg/day | Output Phenol mg/M3 | Output Phenol mg/day | Phenol in Effluent % Reduction in Gas Stream | Phenol in Effluent µg/Liter of Phenol Remaining in Liquid |
|---|---|---|---|---|---|---|---|
| 84 | 9.80 | 1607 | 15744 | 0.19 | 1.82 | 99.9884 | <0.5 |
| 91 | 15.41 | 984 | 15168 | 0.16 | 2.50 | 99.9835 | <0.5 |
| 100 | 15.41 | 1869 | 28800 | 0.10 | 1.58 | 99.9945 | 1.40 |
| 160 | 11.42 | 2300 | 26256 | 0.17 | 1.98 | 99.9928 | 2.50 |
| 184 | 28.54 | 1629 | 46488 | 0.41 | 11.57 | 99.9751 | 1.00 |
| 191 | 28.54 | 2354 | 67200 | 0.17 | 4.78 | 99.9929 | 32.00 |
| 243 | 18.76 | 3807 | 71400 | 0.78 | 14.59 | 99.9796 | |
| 330 | 20.71 | 3390 | 70200 | 0.63 | 13.01 | 99.9815 | <1.00 |
| 337 | 26.03 | 2697 | 70200 | 0.26 | 6.72 | 99.9904 | <1.00 |
| 373 | 10.98 | 6997 | 76800 | 3.54 | 38.88 | 99.9494 | 2.00 |

EXAMPLE 3

On day 337 of the run set out in Table 1 of Example 2, the efficiencies of each zone or sub-chamber in phenol reduction was evaluated. The results of this evaluation are set out in Table 2.

TABLE 2

| Stage | Air Flow M3/day | Input Phenol mg/M3 | Input Phenol mg/day | Output Phenol mg/M3 | Output Phenol mg/day | Phenol in Effluent % Reduction in Gas Stream | Phenol in Effluent µg/Liter of Phenol Remaining in Liquid |
|---|---|---|---|---|---|---|---|
| 1 | 26.03 | 2697 | 70200 | 25.08 | 653 | 99.0701 | 1740.00 |
| 2 | 26.03 | 25 | 653 | 6.51 | 169 | 74.0441 | 433.00 |
| 3 | 26.03 | 7 | 169 | 0.26 | 7 | 96.0340 | 4.82 |
| 4 | 26.03 | 7 | 7 | 0.26 | 7 | 0.0000 | 1.00 |

Based on the above results of the extended run evaluated in Examples 2 and 3, the rotary biocontactor, according to this invention, over more than a year's operation for a variety of inputs of phenol maintained a percent reduction of phenol well in excess of 99%. Furthermore, the phenol removal in each zone of the rotary biocontactor, according to this invention, provides a significant reduction in phenol in the first stage or zone of the biocontactor at a percent reduction rate of 99%. In the second and third stages, the remainder of the phenol within the efficiencies of the unit is removed. According to Table 2, there is no significant amount of phenol removed from stage 4 to thereby indicate that additional stages are not required in the operation of this apparatus for purposes of phenol removal from waste gas streams.

These tests conclusively show that the biomass converts the phenol from the gas stream into carbon by-products. Negligible phenol remains in the liquid medium in the sub-chambers and in the gas leaving the system.

Although preferred embodiments of the invention have been described herein in detail, it will be understood by those skilled in the art that variations may be made thereto without departing from the spirit of the invention or the scope of the appended claims.

The embodiments of the invention in which an exclusive property or privilege is claimed are defined as follows:

1. A process for removing one or more pollutants from a waste gas stream comprising in a rotary biocontactor a biomass capable of assimilating said pollutants and producing metabolites by contacting said waste gas stream with said biomass, said biocontactor having a plurality of serially arranged sub-chambers which are serially in fluid communication above said biomass, each such sub-chamber enclosing a plurality of discs mounted for rotation about a common axis, said biomass being cultured in a bottom portion of said biocontactor in each of said sub-chambers and rotating said discs through said biomass whereby said biomass grows on said discs, introducing to a first of said serially arranged sub-chambers said waste gas stream and passing said waste gas stream through said sub-chambers above said biomass and over exposed portions of said rotating discs having said biomass growing thereon, removing said pollutants from said waste gas stream by said biomass on said exposed portions of said discs absorbing said pollutants, assimilating said pollutants and producing harmless metabolites, exhausting from a last of said sub-chambers said gas stream with a substantial percentage of pollutants removed therefrom and containing any gaseous metabolites at a location in said chamber downstream of where said waste gas is introduced to said chamber, said biomass comprising various microorganism species, the growth of individual species of said various microorganism species is dependent on the concentration of said one or more pollutants in said waste gas stream, the population distribution of said individual species changing from sub-chamber to sub-chamber as determined by concentration of said one or more pollutants decreasing as said gas stream is circulated towards said exhaust location of said chamber.

2. A process of claim 1, wherein a liquid containing said biomass is circulated from one sub-chamber to the next in the direction of flow of said waste gas stream.

3. A process of claim 2, wherein said waste gas stream and liquid of said biomass are circulated from one end of said biocontactor to the other along a tortuous path through said sub-chambers.

4. A process of claim 1 wherein said one or more pollutants are phenols, said process removing said phenols from a waste gas stream containing oxygen wherein said biomass is acclimated to said phenols as a source of carbon nutrient for supporting the growth of said biomass on said discs.

5. A process of claim 2, wherein said circulating of said biomass includes withdrawing a portion of said biomass in a liquid, removing biological solids from said biomass liquid, adding biological nutrients to said biomass liquid to fortify said biomass liquid and returning said fortified biomass liquid to said first sub-chamber.

6. Apparatus for removing pollutants from a waste gas stream by use of a rotary biocontactor comprising a chamber defined within a housing, a plurality of partition means provided within said housing for defining a plurality of serially arranged intercommunicating sub-chambers, aperture means within each said partition means providing for liquid and gas communication between adjacent sub-chambers, means for introducing a waste gas stream to a first of said sub-chambers and means for exhausting a gas stream from a last of said sub-chambers, rotary means extending through all of said sub-chambers on which a plurality of discs are mounted in each sub-chamber, means for rotating said rotary means to rotate said discs within each sub-chamber, each of said sub-chambers containing a biomass to a level of said aperture means providing for liquid flow from one sub-chamber to the next, means for withdrawing biomass liquid from a last of said sub-chambers and means for introducing to said first sub-chamber a liquid containing nutrients for said biomass, said chamber housing comprising opposing hemi-cylindrical shells with end walls, means for connecting said shells together to define therewithin said chamber which is cylindrical shape, said shells having semi-circular shaped spaced-apart baffles as said partition means to define a portion of each sub-chamber in said chamber, each of said baffles in one of said shells being in register with corresponding baffles of the other shell when said shells are connected together by said connecting means, said baffles in each shell which are in register contacting each other to seal the sub-chamber, said aperture means being the sole form of communication between adjacent sub-chambers, wherein said apertures means comprises a lower aperture in said partition means for determining liquid biomass level in a respective sub-chamber and an upper aperture in said partition means through which a waste gas stream flows in passing over said discs, and wherein said aperture means in said partition means is arranged to define a tortuous flow path for a waste gas stream as it passes over said biomass and around said discs.

7. Apparatus of claim 6 wherein said sics are of open mesh on which a biomass grows when cultured in a corresponding sub-chamber.

8. An apparatus of claim 6 further comprising means for separating solids from biomass liquid obtained from said withdrawal means, means for introducing nutrients to remaining liquid emerging from said solids separator, means for returning said remaining liquid with nutrients to said means for introducing liquid to said first sub-chamber.

9. An apparatus of claim 6, wherein each of said opposing shells and partition means are formed of a fiberglass polyester resin composition.

* * * * *